United States Patent Office 2,695,308
Patented Nov. 23, 1954

2,695,308

TRICHLOROETHYL TRICHLOROVINYL-SULFONATE

Everett E. Gilbert, Flushing, N. Y., assignor to Allied Chemical & Dye Corporation, New York, N. Y., a corporation of New York No Drawing. Application September 17, 1952, Serial No. 310,139

4 Claims. (Cl. 260—456)

This invention relates to trichloroethyl trichlorovinylsulfonate and to its preparation.

An object of the present invention is to produce a new compound, trichloroethyl trichlorovinylsulfonate.

Certain chlorinated derivatives of ethylene have been known to be reactive with sulfur trioxide. Thus, tetrachloroethylene although sufficiently inert to sulfur trioxide at moderate temperatures to be of practical value as a solvent for it—will react under extreme conditions to yield trichloroacetyl chloride as follows:

$$CCl_2=CCl_2 + SO_3 \rightarrow Cl_3CCOCl$$

Symmetrical dichloroethylene reacts, on the other hand, with sulfur trioxide by a different type of reaction as follows:

$$ClCH=CHCl + 2SO_3 \longrightarrow$$

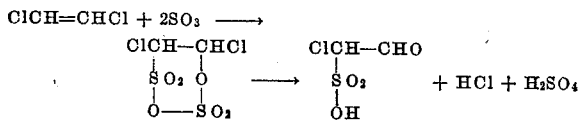

Trichloroethylene has been shown to react with oleum by a reaction similar to that cited above for symmetrical dichloroethylene as follows:

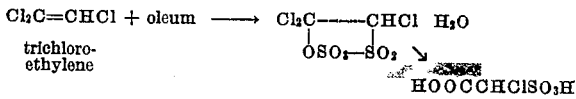

Nevertheless, trichloroethylene has previously been believed inert to sulfur trioxide since it has been suggested as an inert solvent.

The reaction of the present invention is different from these known types of reactions for chlorinated ethylenes with sulfur trioxide. In accordance with the present invention trichloroethylene can be reacted with sulfur trioxide to yield the compound heretofore unknown, namely, trichloroethyl trichlorovinylsulfonate. The reaction appears to proceed as follows:

$$2CHCl=CCl_2 + SO_3 \rightarrow Cl_2C=CClSO_2OCCl_2CClH_2$$

The trichloroethyl trichlorovinylsulfonate product was found to be a white, odorless, crystalline solid having a melting point of about 108° C. The trichloroethyl trichlorovinylsulfonate product, upon analysis showed the following comparison with theory:

|  | Found | Theory for $C_4Cl_6SO_3H_2$ |
|---|---|---|
| Chlorine | 62.4 | 62.1 |
| Carbon | 14.6 | 14.0 |
| Hydrogen | 0.8 | 0.6 |
| Sulfur | 8.9 | 9.3 |
| Molecular weight | 339 | 343 |

To further confirm the formula of the reaction product of the present invention an aqueous alkaline hydrolysis of the product was carried out and found to be consistent with the equation:

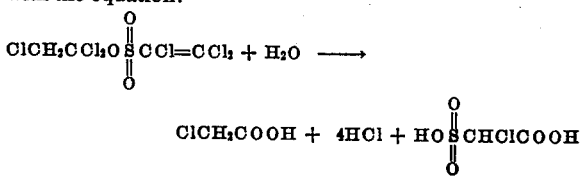

The compound trichloroethyl trichlorovinylsulfonate was tested to determine its fungicidal properties. Parts per million required to give 50% control of brown rot of fruit (*Sclerotinia fructicola*) was 5, while the same for vegetable blight (*Alternaria oleracea*) was 1.0, using the standard spore germination test method. These figures illustrate that this compound has excellent fungicidal activity.

The reaction may be effected by admixing trichloroethylene and sulfur trioxide and maintaining the mixture for a sufficient length of time to produce trichloroethyl trichlorovinylsulfonate. Liquid sulfur trioxide, stabilized sulfur trioxide commercially known as "sulfan," i. e. $SO_3$ stabilized with a small percentage of a stabilizing compound such as boric oxide, or gaseous $SO_3$ in concentrated or dilute form may be employed as the reactant. High temperatures for carrying out the reaction are unnecessary and indeed, low temperatures, below about 87° C., favor the reaction. Increased yield of the desired product, trichloroethyl trichlorvinylsulfonate, was obtained by gradually adding liquid sulfur trioxide to liquid trichloroethylene while agitating and cooling to maintain the mixture at a temperature below 25° C., preferably within the range of $-5°$ to $+10°$ C.

The following examples illustrate the present invention:

*Example 1*

Sulfur trioxide (145 grams—1.81 moles) was added dropwise over a 20 minute period to trichloroethylene (525 grams—4 moles) in an open beaker externally cooled with a Dry Ice-acetone cooling bath to maintain $-5$ to $+5°$ C., stirring with a thermometer during addition. After completed addition, the reaction mixture was poured into water. The oily reaction product was then washed twice with fresh water, and the unreacted trichloroethylene was distilled off to yield a heavy oil which solidified to a hard, cream-colored cake which was the desired product. A yield of 125 grams was obtained.

*Example 2*

The above Example 1 was repeated, except that 160 grams (2 moles) of $SO_3$ was used, the addition time was 10 minutes at 0–10° C. and petroleum ether was used to extract the desired product from the mixture with water. A yield of 112 grams was obtained.

*Example 3*

Example 2 was repeated except that the quantity of trichloroethylene used was reduced to 393 grams (3 moles). A yield of 111 grams of white product was obtained.

*Example 4*

$SO_3$ (160 grams—2 moles) was dissolved in 500 grams of trichlorofluoromethane used as a solvent. This mixture was then added slowly with stirring and cooling to trichloroethylene (262 grams—2 moles), maintaining a temperature of 10–25° C. The reaction mixture was water washed, and evaporated to dryness to yield 30 grams of the desired product.

*Example 5*

$SO_3$ (40 grams—½ mole) was added dropwise with stirring to trichloroethylene (65.5 grams—½ mole) at 10° C., using ice bath cooling. After completed addition, the reaction mixture was heated 2 hours at 50° C. On standing at room temperature for 2 days, crystals were noted to separate from the reaction mixture. A yield of 53 grams of crude product was filtered from the reaction mixture.

I claim:

1. Trichloroethyl trichlorovinylsulfonate.
2. The process which comprises admixing trichloroethylene and sulfur trioxide as the sole reactants and maintaining the mixture for a sufficient length of time to produce trichloroethyl trichlorovinylsulfonate.
3. The process which comprises admixing trichloroethylene with sulfur trioxide as the sole reactants and maintaining the mixture at a temperature below about 25° C. for a sufficient length of time to produce trichloroethyl trichlorovinylsulfonate.

4. The process which comprises adding liquid sulfur trioxide to trichloroethylene as the sole reactants and maintaining the mixture at a temperature within the range of —5° to +10° C. for a sufficient length of time to produce trichloroethyl trichlorovinylsulfonate.

References Cited in the file of this patent

UNITED STATES PATENTS

| Number | Name | Date |
|---|---|---|
| 1,835,404 | Kalischer et al. | Dec. 8, 1931 |